(12) United States Patent
Komiya

(10) Patent No.: US 8,351,991 B2
(45) Date of Patent: Jan. 8, 2013

(54) MOBILE TERMINAL AND COMPUTER PROGRAM INCLUDING A TOUCH-SENSITIVE INTERNAL STATE INDICATOR

(75) Inventor: Kozo Komiya, Tokyo (JP)

(73) Assignee: Sony Mobile Communication AB, Lund (SE)

(*) Notice: Subject to any disclaimer, the term of this patent is extended or adjusted under 35 U.S.C. 154(b) by 236 days.

(21) Appl. No.: 12/613,721

(22) Filed: Nov. 6, 2009

(65) Prior Publication Data

US 2010/0144395 A1    Jun. 10, 2010

(30) Foreign Application Priority Data

Dec. 5, 2008  (JP) ................. 2008-310698

(51) Int. Cl.
   *H04B 1/38* (2006.01)
(52) U.S. Cl. ........................ 455/566; 455/567
(58) Field of Classification Search .......... 455/566, 455/550.1, 556.2, 567, 575.1, 90.3, 414.1, 455/415
   See application file for complete search history.

(56) References Cited

U.S. PATENT DOCUMENTS

| | | | |
|---|---|---|---|
| 6,839,050 B2* | 1/2005 | Sakamaki et al. | 345/156 |
| 7,136,894 B2* | 11/2006 | Britt, Jr. | 709/201 |
| 7,336,977 B2* | 2/2008 | Katayanagi | 455/567 |
| 7,957,770 B2* | 6/2011 | An et al. | 455/567 |
| 2004/0058718 A1* | 3/2004 | Yu | 455/567 |
| 2006/0049920 A1* | 3/2006 | Sadler et al. | 340/407.1 |
| 2006/0227981 A1* | 10/2006 | Miyata | 381/124 |
| 2007/0133770 A1* | 6/2007 | LaPierre et al. | 379/142.01 |
| 2008/0218490 A1* | 9/2008 | Kim et al. | 345/173 |
| 2009/0051667 A1* | 2/2009 | Park et al. | 345/173 |
| 2009/0088204 A1* | 4/2009 | Culbert et al. | 455/556.1 |
| 2009/0167701 A1* | 7/2009 | Ronkainen | 345/173 |

FOREIGN PATENT DOCUMENTS

| | | |
|---|---|---|
| CN | 101521857 A | 9/2009 |
| EP | 1 544 720 A1 | 6/2005 |
| IT | 01249638 | 3/1995 |
| JP | 2007-122501 | 5/2007 |
| WO | WO 2004/083996 A2 | 9/2004 |

OTHER PUBLICATIONS

Search Report issued Apr. 1, 2010, in European Patent Application No. 09176072.8-2414.
Chinese Office Action issued Aug. 23, 2011, in Patent Application No. 200910225774.3 (English-language translation only).
Office Action in Chinese Patent Application No. 2009-10225774.3, issued Mar. 1, 2012.

* cited by examiner

*Primary Examiner* — Brandon Miller
(74) *Attorney, Agent, or Firm* — Oblon, Spivak, McClelland, Maier & Neustadt, L.L.P.

(57) ABSTRACT

A mobile terminal, including a touch panel detecting a touch position; a vibration generation device configured to generate vibration; an assignment device configured to assign different vibration area patterns that define vibration areas generating the vibration on the touch panel, to a plurality of internal states, respectively; and a control device configured to activate, according to a current internal state, the vibration area pattern assigned to the internal state and to control the vibration generation device so as to generate the vibration while the vibration area is being touched.

9 Claims, 8 Drawing Sheets

MOBILE TERMINAL AND COMPUTER PROGRAM INCLUDING A TOUCH-SENSITIVE INTERNAL STATE INDICATOR

BACKGROUND OF THE INVENTION

1. Field of the Invention

The present invention relates to a mobile terminal provided with a touch panel for detecting a touch position and a vibration generation means for generating vibration, and to a computer program operating on the mobile terminal.

2. Description of the Related Art

Currently, a mobile terminal such as a mobile phone is provided with a function in which a user is notified of arrival of a mail or a telephone call at the arrival thereof by a built-in vibrator generating vibration in a housing. At this time, by changing a vibration pattern, it is possible to provide the user with information such as which of a mail and a telephone call is being received and from whom the mail or call has come.

Japanese Unexamined Patent Application Publication No. 2007-122501 discloses a technique in which a vibration pattern (vibration frequency, vibration amplitude, or the number of vibrations) is selected corresponding to an object touched by a user on a touch panel which is disposed to overlap a display screen and an output vibration pattern is generated according to the selected vibration pattern.

SUMMARY OF THE INVENTION

In a mobile terminal of the above related technique, information regarding arrival of a mail or a call is given at the time of arrival. For confirming from whom the mail or call has come after some time has elapsed from the arrival, a user has to carry out a predetermined operation on a display screen and display a history of incoming calls or mails.

In such a case, it is convenient to be able to know from whom the mail or call has come without watching the screen.

According to an embodiment of the present invention, there is provided a mobile terminal that enables a user to identify an internal state of the mobile terminal by a sense of touch.

A mobile phone according to an embodiment of the present invention includes: a touch panel for detecting a touch position; a vibration generation means for generating vibration; an assignment means for assigning different vibration area patterns that define vibration areas generating the vibration on the touch panel, to a plurality of internal states, respectively; a control means for activating, according to a current internal state, the vibration area pattern assigned to the internal state and controlling the vibration generation means so as to generate the vibration while the vibration area is being touched.

Here, "internal state" means a current state inside the mobile terminal, for example, a state related to an incoming telephone call or mail. More specifically, "internal state" means a state indicating that the terminal has received an incoming telephone call or a mail from a specified originator.

A computer program according to an embodiment of the present invention, which operates on a mobile terminal provided with a touch panel for detecting a touch position and a vibration generation means for generating vibration, causes the mobile terminal to execute the steps of: assigning different vibration area patterns that define vibration areas generating the vibration on the touch panel, to a plurality of internal states, respectively; activating, according to a current internal state, the vibration area pattern assigned to the internal state; and controlling the vibration generation means so as to generate vibration while the vibration area is being touched.

According to an embodiment of the present invention, a user can know an internal state of a mobile terminal by a sense of touch without watching a screen thereof. Thereby, the user can recognize whether a mail has arrived or not and from whom an incoming mail or telephone call has come, while leaving the mobile terminal in a pocket or a bag.

DESCRIPTION OF THE PREFERRED EMBODIMENTS

Figure 1:
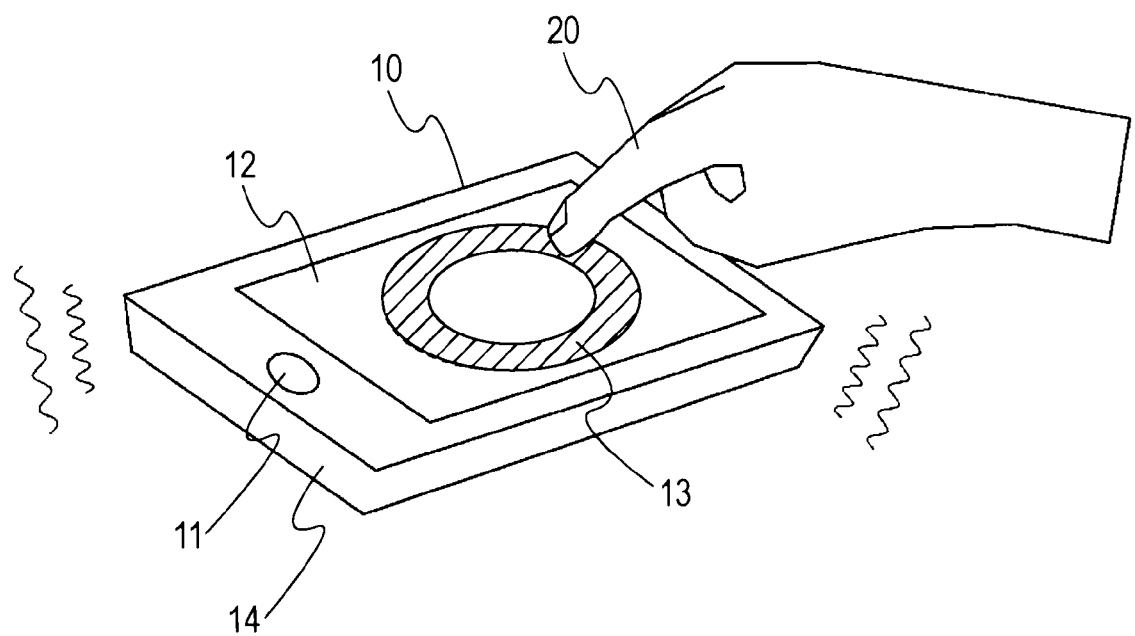
FIG. 1 is a diagram showing a schematic appearance configuration of a mobile phone terminal according to an embodiment of the present invention.

Hereinafter, a preferable embodiment of the present invention will be described in detail with reference to the drawings. FIG. 1 is a diagram showing a schematic appearance configuration of a mobile phone terminal 10 according to the present embodiment. In the following, the embodiment will be described in more detail for a case in which the present invention is applied for identifying existence or non-existence of a mail or a telephone call and for identifying an originator thereof.

This mobile phone terminal 10 includes a touch panel 12 disposed on a principal surface of a housing 14. On a side of the touch panel 12, there is disposed a button 11 which can be operated by a user.

The touch panel 12 combines a display device (display part) such as an LCD with a touch sensor that is disposed to overlap a display screen thereof and can recognize what part of the screen is touched by the user. For such a touch panel, it is possible to use a touch panel generally used for a mobile terminal, an ATM terminal, etc.

In the mobile phone terminal 10 shown in FIG. 1, when the user touches any point within a vibration area pattern 13 indicated by the hatching on the touch panel 12, a vibrator (vibration generation means) vibrates in the mobile phone terminal 10. The user can identify a shape of the vibration area pattern 13 vibrating on the touch panel 12 by recognizing a vibrating area and a non-vibrating area while moving a finger on the touch panel 12.

In this configuration, by assigning the vibration area patterns 13 having different configurations to a plurality of internal states of the mobile phone terminal 10, respectively, the user can identify the internal state of the mobile phone terminal by touch.

Figure 2:
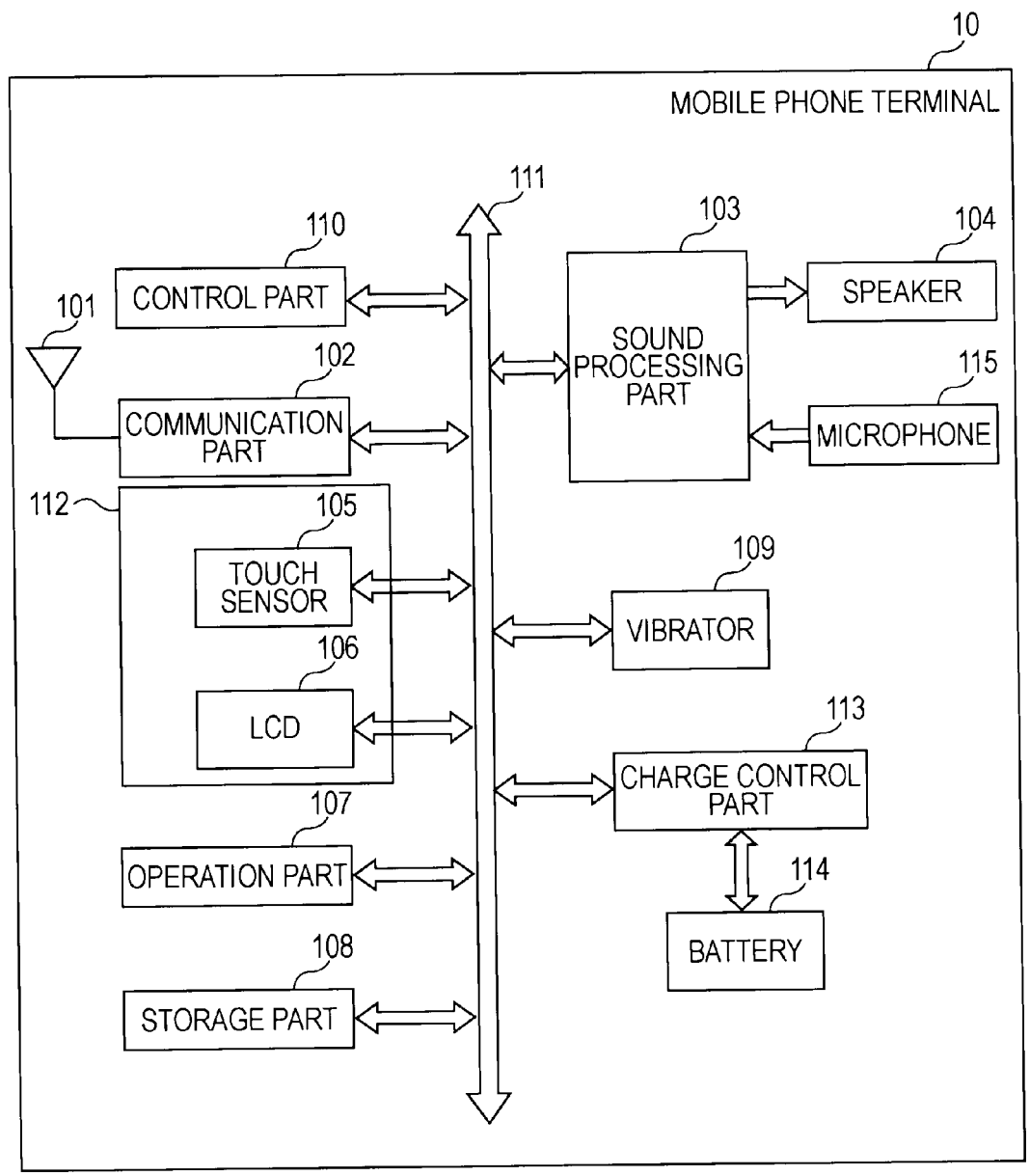
FIG. 2 is a block diagram showing a hardware configuration inside the mobile phone terminal shown in FIG. 1.

FIG. 2 is a block diagram showing a hardware configuration inside the mobile phone terminal 10.

The mobile phone terminal 10 includes a control part 110, a communication part 102, the touch panel 12, a sound processing part 103, an operation part 107, a storage part 108, a vibrator 109, a charge control part 113, and the like, which are connected to each other by a bus 111.

The control part 110 includes a processor such as a CPU and configures a control means for carrying out control of each part by software control.

The communication part 102 is connected to a telephone base station (not shown in the drawing) by a radio wave via an antenna 101 as a means for carrying out communication such as a telephone call or a mail.

The touch panel 12 is configured by a combination of a display device 106 such as the LCD performing information display on a display screen and a touch sensor 105 disposed to overlap the display screen. With the touch sensor 105, a user can feel what part of the display screen the user is touching.

The sound processing part 103 is connected to a speaker 104 and a microphone 105 as a means for performing sound processing and input/output control.

The operation part 107 is a means for enabling the user to perform instruction and information input for the mobile phone terminal 10, and includes a button 11 shown in FIG. 1. The operation part 107 may include a button, a key, and the like, in addition to the button 11.

The storage part 108 includes a ROM (can include a rewritable flash memory or the like) storing a computer program executed by the CPU of the control part 110 and various kinds of data, and a memory such as a RAM providing a work area and a temporary storage area. The storage part 108 additionally may include an external memory and a large capacity storage unit such as an HDD.

The vibrator 109 is the vibration generation means for generating vibration. Specifically, the vibrator 109 is realized by an eccentric motor (not shown in the drawing) vibrating the entire housing 14 of the mobile phone terminal 10. In addition, the vibrator 109 may be a piezoelectric element configured to vibrate the touch panel 12.

The charge control part 113 is a means for controlling charge operation of a battery 114 which is a secondary battery.

The mobile phone terminal 10 additionally may include any other element such as a camera part, a near-field radio communication part, and the like, which are not shown in the drawing.

As described above, in an existing mobile phone terminal, a ring tone sounds for notifying a user of the arrival when an incoming voice call or mail has arrived. When a manner mode is set, a vibrator vibrates instead of the ring tone ringing. The vibration of this vibrator is stopped by a predetermined user operation. Alternatively, the ring tone stops ringing after a certain time has elapsed without performing the predetermined operation. For knowing from whom an incoming voice call or mail has come and which of an incoming voice call and mail has arrived after the vibrator has stopped, the user has to carry out confirmation by operating the terminal for displaying an arrival history or the like on the screen.

In the mobile phone terminal 10 of the present embodiment, the user pushes the button 11 first, and subsequently, moves a finger in a scanning manner while leaving the finger on the touch panel 12 (keeping a contact state). The mobile phone terminal 10 vibrates the vibrator 109 only while the user's finger is on the vibration area pattern 13 (part indicated by the hatching in FIG. 1). Here, the vibration area pattern 13 of FIG. 1 does not have to be displayed on a screen of the touch panel 12. If displayed, however, the vibration area pattern can also be identified visually. The user can feel, by a sense of touch, which finger position on the touch panel causes the terminal to vibrate, and thereby can recognize the vibrating area on the touch panel. Accordingly, by assigning different vibration area patterns preliminarily to other parties (senders) or groups thereof of a telephone call and a mail, the user can identify the other parties or groups. In addition, a change of the vibration mode (change of frequency, strength of vibration, ON/OFF pattern of vibration on the time scale, etc.) may be used together with the vibration area pattern. For example, it is possible to discriminate a telephone call and a mail from each other by there different vibration modes.

Figure 3A:
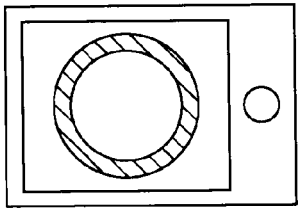
FIGS. 3A and 3B are diagrams showing an example of a screen for registering a vibration area pattern in an embodiment of the present invention.
Figure 3B:
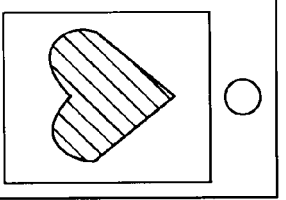

FIGS. 3A and 3B are diagrams showing examples of a screen for registering a vibration area pattern. Here, the registration screen is configured to assign the vibration area pattern to each group of originators and register the vibration area pattern as a "touch sensitive arrival" according to an embodiment of the present invention in addition to the phone ring tone and the mail ring tone, by utilizing a telephone directory (or address book) function provided for the mobile phone terminal. The registration screen may be configured to assign the vibration area pattern to the originator itself for registration instead of the originator group. Note that, in the embodiment of the present invention, the assignment to the originator group includes the assignment to the originator in a broad concept.

For the vibration area pattern, a plurality of options are preliminarily prepared, and the user can select a desired pattern from a selection screen which is not shown in the drawing.

The examples shown in FIGS. 3A and 3B show a donut type pattern and a heart type pattern for the vibration area pattern, respectively. These two patterns have an overlapping vibrating area, and it is difficult for a user to identify the pattern only by touching the area. However, the user can recognize the difference in the patterns by real time ON/OFF control of the vibration according to the finger position on the touch panel, when the user moves a finger on the touch panel while touching the touch panel. For example, when the donut type pattern is selected, the vibration stops just at the time when the user's finger comes to the center of the screen, while the vibration continues for the heart type pattern.

Figure 4:
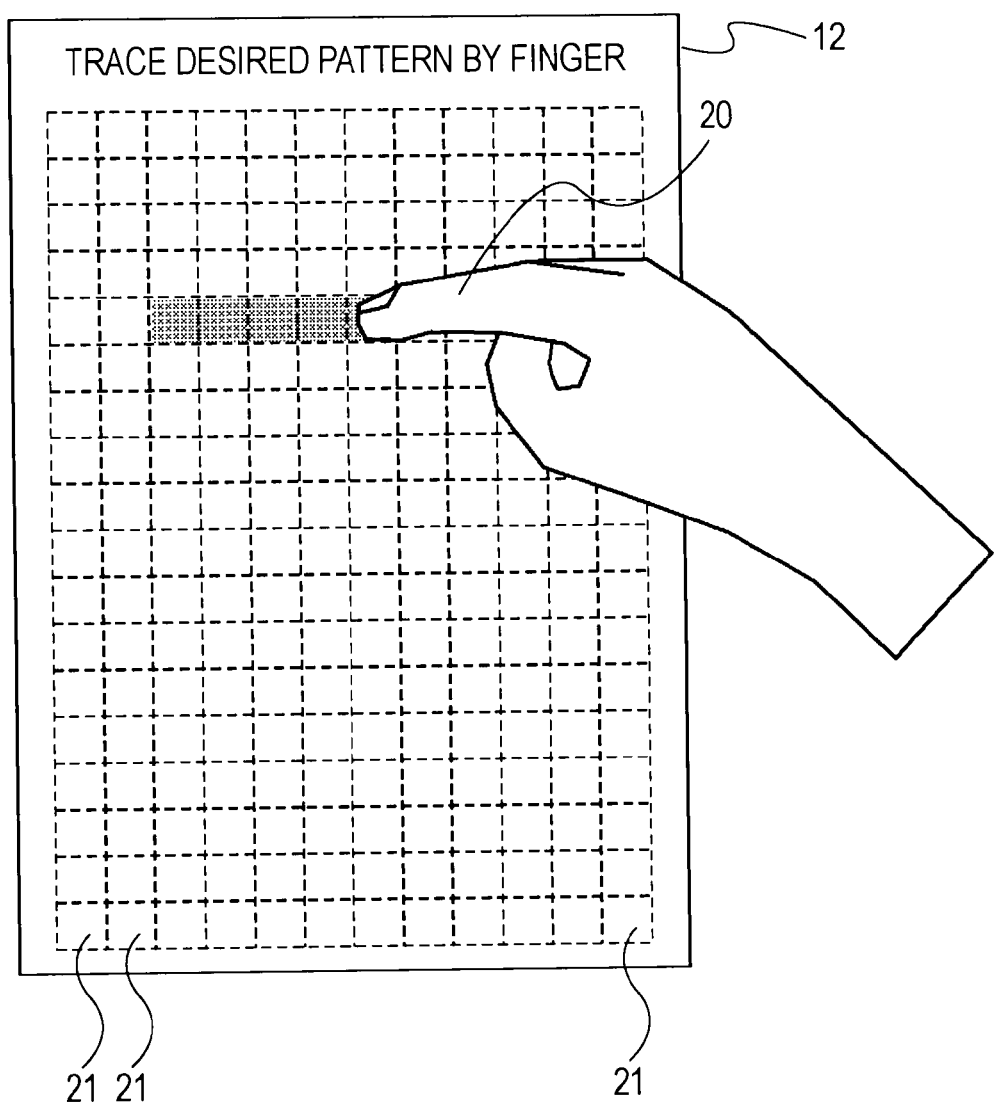
FIG. 4 is an explanatory diagram for generation and registration of a new vibration area pattern in an embodiment of the present invention.

Further, a new vibration area pattern may be generated and registered by a user's instruction in which a user indicates a unit area forming the vibration area on the touch panel by a finger. FIG. 4 shows an example of such a registration. By tracing a desired unit area 21 by a finger 20 on the touch panel 12, the user can generate a desired vibration area pattern. The generated vibration area pattern is added to the above options.

Note that the numbers of the unit areas 21 in the vertical and horizontal directions are shown exemplarily in FIG. 4 and are not limited to the numbers shown in the drawing. By increasing these numbers in the vertical and horizontal directions, resolution is improved and a finer pattern will be available.

FIG. 5A to FIG. 7E show various specific examples of the vibration area pattern. These vibration area patterns may be stored in the storage part 108 preliminarily as the options when the mobile phone terminal is shipped, or may be generated and registered by a user afterward.

Figure 5A:
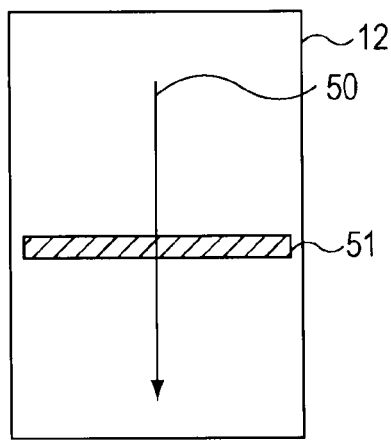
FIGS. 5A to 5F are diagrams showing specific examples of a vibration area pattern in an embodiment of the present invention.
Figure 5B:
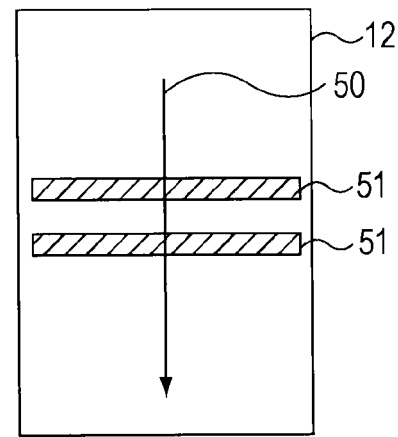
Figure 5C:
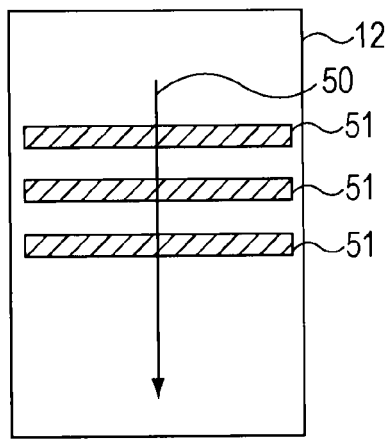

FIGS. 5A to 5F show an example of the vibration area pattern configured with one or more straight line areas (here, called bars). FIGS. 5A to 5C show examples in which different numbers of bars 51 are disposed in parallel for each of the vibration area patterns. On the drawing, the area indicated by the hatching is the vibration area. When confirming the vibration area pattern, the user can identify the vibration area patterns of FIG. 5A to FIG. 5C by confirming the number of vibrations while moving a finger in the arrow direction 50, for example, in contact with the touch panel 12. The number of bars may be further increased.

Figure 5D:
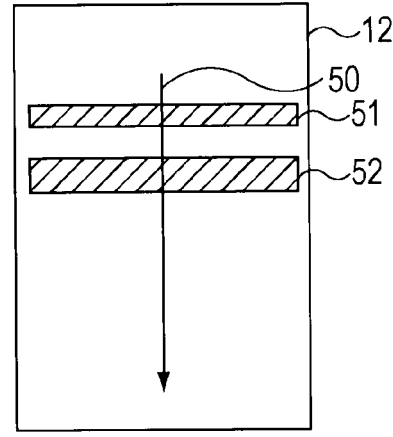
Figure 5E:
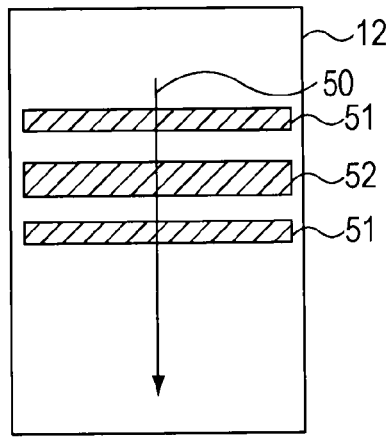
Figure 5F:
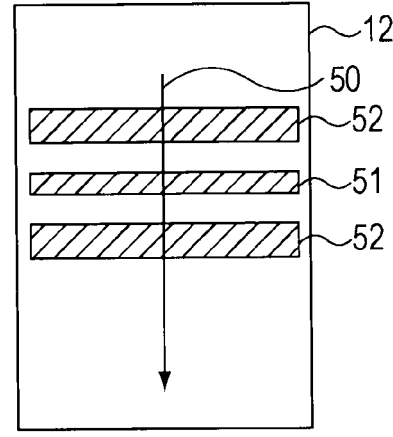

FIG. 5D to FIG. 5F show examples of the vibration area pattern configured with combinations of bars 51 and 52 having different widths. In these cases, when moving a finger along the arrow direction 50 at an approximately constant speed in the same way, the user can feel not only the number of vibrations but also a change in vibration duration of each bar. For example, in the example of FIG. 5D, the user can feel two vibrations of "short" and "long" in this order. In the example of FIG. 5E, the user can feel three vibrations of "short", "long", and "short" in this order. In the example of FIG. 5F, the user can feel three vibrations of "long", "short", and "long" in this order. Also in this case, the number of bars is not limited to two or three and the number of widths is not limited to two. Further, the combination of short and long is not limited to the combination shown in the drawing.

Figure 6A:
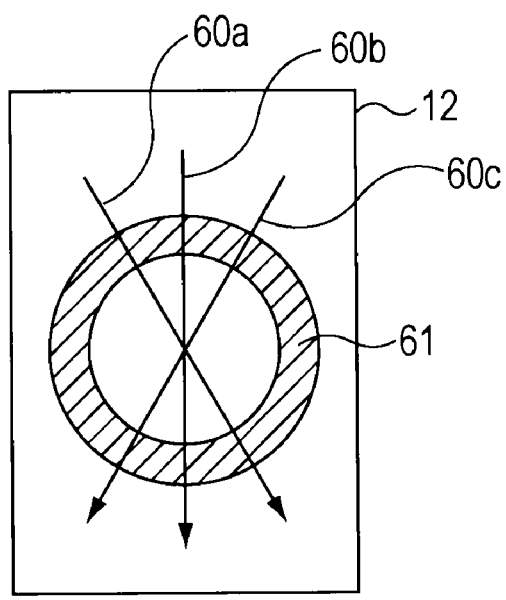
FIGS. 6A and 6B are diagrams showing other specific examples of a vibration area pattern in an embodiment of the present invention.
Figure 6B:
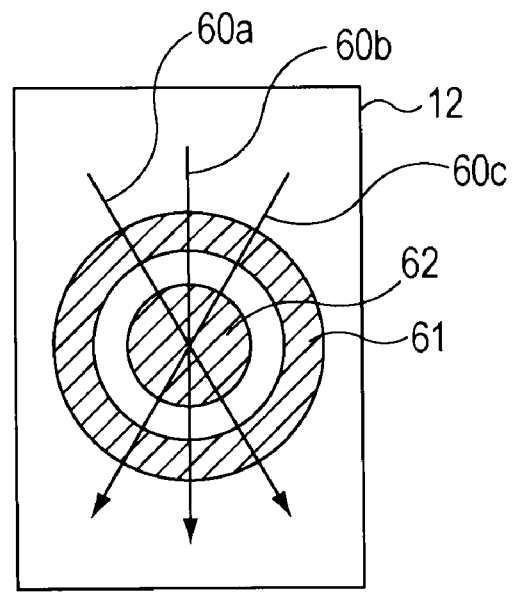
Figure 7A:
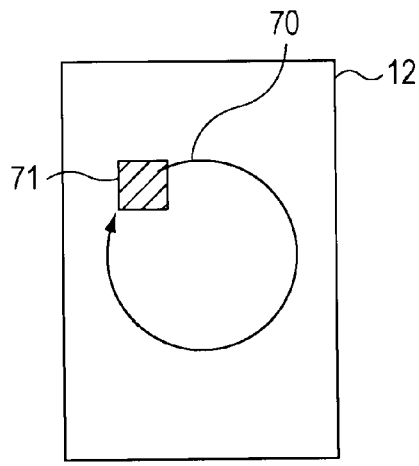
FIGS. 7A to 7E are diagrams showing still other specific examples of a vibration area pattern in an embodiment of the present invention.
Figure 7B:
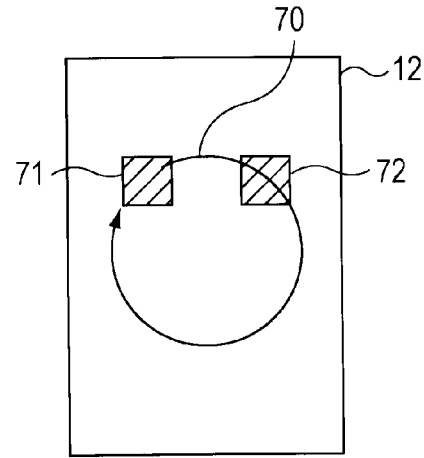
Figure 7C:
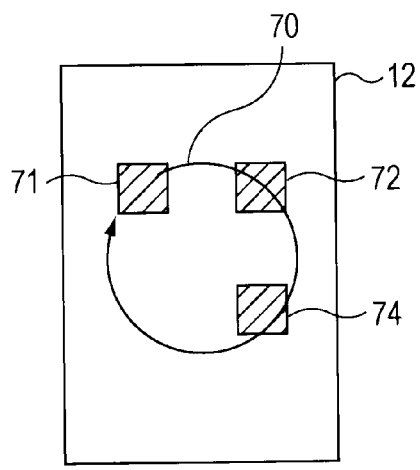
Figure 7D:
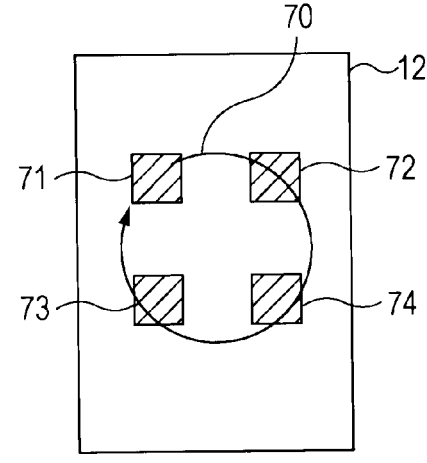
Figure 7E:
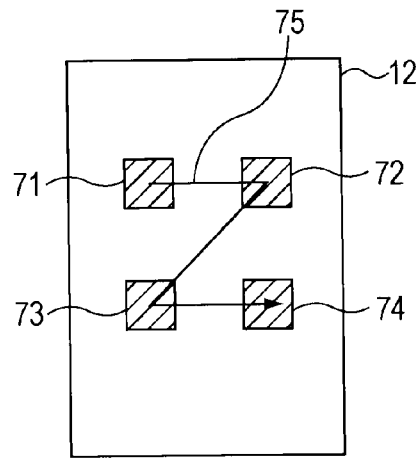

FIGS. 6A and 6B show a vibration area pattern having a donut type area 61 as shown in FIG. 3A and a vibration area pattern having a circular area 62 within the ring, respectively. In addition to the mode shown in the drawing, a plurality of co-centric rings may be provided. These patterns have shapes with rotational symmetry around the centers, and thereby it is possible to recognize the vibration area patterns even when the finger scan is made in different directions as shown by the arrows 60a, 60b, and 60c.

FIGS. 7A to 7E show still other examples of the vibration area patterns. In these examples, the areas 71 to 74 are arranged at respective four corners of a predetermined square (or on the circumference of a predetermined circle). While a square shape is shown for each of the areas, the area may have another shape such as a circle. A user can identify the patterns of FIGS. 7A to 7D by the number of recognized vibrations when moving a finger circularly as shown by the arrow 70. The finger may be moved in a zigzag manner as shown by the arrow 75 in FIG. 7E.

The vibration area pattern shown above is a kind of positive pattern defining a vibrating area. On the other hand, a kind of negative pattern may be employed for defining a non-vibrating area.

Figure 8:
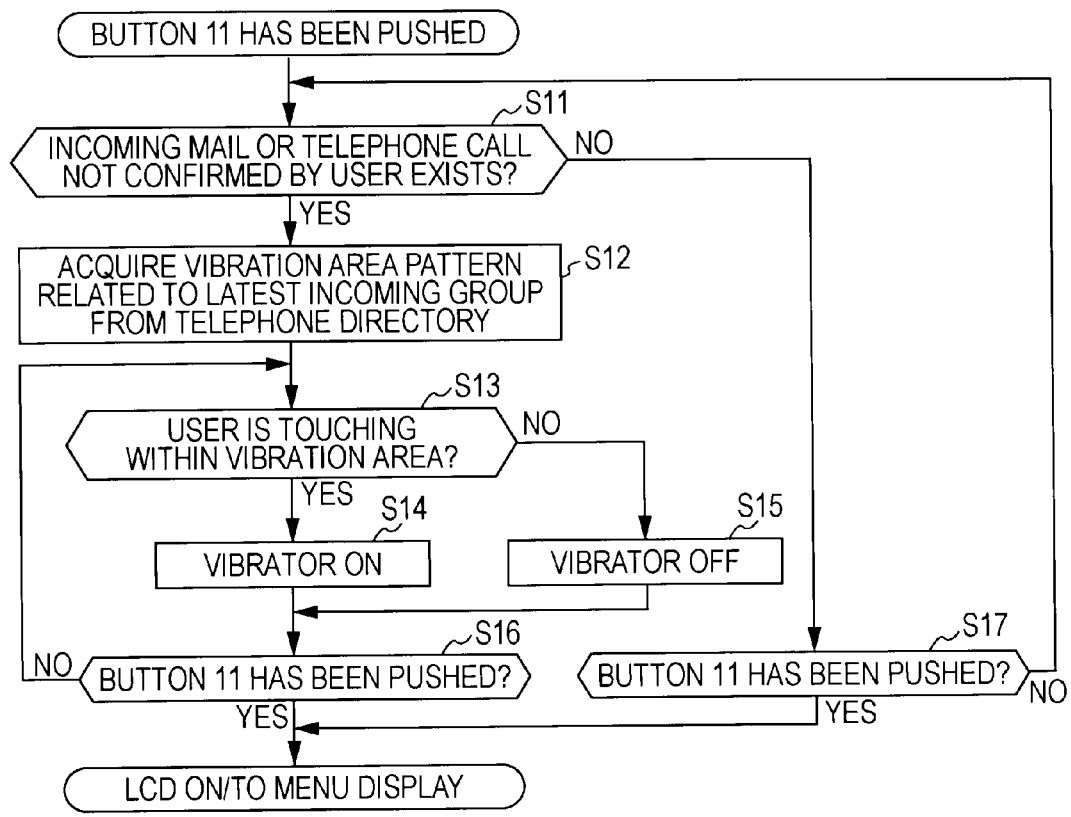
FIG. 8 is a flowchart showing a processing flow of a mobile phone terminal in an embodiment of the present invention.

FIG. 8 shows a processing flow when the button 11 has been pushed during a stand-by mode of the mobile phone terminal 10 in the present embodiment. The stand-by mode is a state in which the LCD and an LCD backlight of the mobile phone terminal 10 are turned off and power consumption is suppressed to a level as low as possible. Note that a method of activating the processing of FIG. 8 by menu selection operation may be used instead of the operation of the button 11.

When the button 11 has been pushed during the stand-by mode of the mobile phone terminal 10, the mobile phone terminal 10 checks whether there exists an incoming telephone call or mail which has not been confirmed by a user (S11). If such an incoming telephone call or mail does not exist and the button 11 is pushed again (S17, No), the mobile phone terminal 10 terminates this processing and moves to a menu display.

When an incoming telephone call or mail as described above exists in step S11, the mobile phone terminal 10 acquires the vibration area pattern associated with the latest arrival group from a telephone directory (S12).

Subsequently, the mobile phone terminal 10 activates the vibration area pattern and checks whether or not the user is touching the inside of the vibration area of the vibration area pattern (S13).

When the user touches the touch panel, the mobile phone terminal 10 detects the position the user is touching and turns on the vibrator 109 while the touch position is within the vibration area (S14). The mobile phone terminal 10 turns off the vibrator 109 when the user is not touching the touch panel or the touch position is outside the vibration area (S15).

When the user pushes the button 11 again (S16, Yes), the mobile phone terminal 10 terminates this processing and moves to an operation mode carrying out usual menu display.

In such processing, a user can recognize from which originator a telephone call or mail has come by touching the vibration area pattern generated by the vibrator 109 operating only while a finger is touching the area of the vibration area pattern, at any time after the arrival of an unconfirmed incoming mail or telephone call. Further, when an incoming mail or telephone call does not exist, the user can recognize that an incoming telephone call or mail does not exist by feeling that the terminal does not vibrate even when touching any part of the touch panel.

In this manner, a user can know an internal state of the mobile terminal with a sense of touch without watching the screen. Thereby, it is not necessary at all for the user to watch the display screen when identifying an incoming telephone call or mail. Accordingly, the user can know the internal state of the terminal, for example, whether an incoming mail exists or not and from whom an incoming mail or telephone call has come, only by a sense of touch while leaving the mobile phone terminal 10 in a pocket or a bag.

In addition, such a user interface which does not depend on a visual display on a display screen is also effective for a person having visual impairment. In this case, the mobile phone terminal may be provided with voice notification of a receiving state or a function of reading a mail using speech synthesis.

Further, the present embodiment also has an effect of making use of a mobile terminal pleasurable (feeling of excitation).

While a preferable embodiment of the present invention is described hereinabove, various modifications and variations are possible in addition to the above embodiment.

For example, while the notification by the touch panel and the vibration is used for identifying the existence or nonexistence of a mail or telephone call and the originator thereof, additionally the above embodiment can indicate other information regarding a mobile terminal. Specifically, there are ways of confirming, by touch, radio wave conditions such as "out of service area", a remaining battery level, a communication fee, a residual account of electronic money, and the like. For example, it is possible to represent a quantity level by the above number of bars. In a case in which plural kinds of internal states exist to be represented by the vibration area pattern, another button may be prepared for switching output modes for the respective kinds of internal states.

For the vibration area pattern, various different patterns may be used in addition to the patterns exemplarily shown in the drawings.

While the touch panel is described as a device combining a display function, the display function is not a necessary element for the basic operation of an embodiment of the present invention and the display device may not be used in some applications.

Further, while a touch panel extending in two dimensions is shown for the touch panel, a one dimensional touch panel may be used. In this case, the touch panel is disposed in a line at a particular position on the two dimensional display screen. A user traces the one dimensional touch panel in the longitudinal direction using a finger and thereby recognizes the existence or non-existence of vibration, frequency, strength, length, and the like, from the one dimensional position, and can identify the vibration area pattern.

A computer program for realizing the function described in the above embodiment by a computer and a recording medium storing the program computer-readably are also included in the present invention. The "computer-readable recording medium" for supplying the program includes a magnetic storage medium (flexible disk, hard disk, magnetic tape, or the like), an optical disk (magneto-optical disk such as MO and PD, CD, DVD, or the like), semiconductor storage, a paper tape, and the like, for example.

The present application contains subject matter related to that disclosed in Japanese Priority Patent Application JP 2008-310698 filed in the Japan Patent Office on Dec. 5, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal, comprising:
   a touch panel detecting a touch position;
   means for generating vibration;
   means for assigning different user-creatable vibration area patterns having different shapes that outline vibration areas generating the vibration on the touch panel, to a plurality of internal states, respectively;
   means for activating, according to a current internal state, the vibration area pattern assigned to the current internal state and for controlling the means for generating so as to generate the vibration while the vibration area is being touched; and
   means for enabling a user to register a new pattern for the vibration area pattern,
   wherein the user registers the new pattern for the vibration area pattern by tracing the new pattern on the touch panel.

2. The mobile terminal according to claim 1, further comprising
   means for receiving telephone calls or mails, wherein the current internal state is a state indicating that the terminal has received an incoming telephone call or a mail.

3. The mobile terminal according to claim 2, wherein
   the means for assigning is realized by a telephone directory function having a function assigning each vibration area pattern to a caller of the telephone call or a sender of the mail.

4. The mobile terminal according to claim 2, wherein
   the means for activating makes a vibration mode of the means for generating different between a telephone call and a mail.

5. The mobile terminal according to claim 1, wherein the current internal state indicates that a communication was not confirmed by a user.

6. A program operating on a mobile terminal that includes a touch panel detecting a touch position and a vibration generation device configured to generate vibration, the program causing the mobile terminal to execute a method comprising:
   assigning different user-creatable vibration area patterns having different shapes that outline vibration areas generating the vibration on the touch panel, to a plurality of internal states, respectively;
   activating, according to a current internal state, the vibration area pattern assigned to the current internal state;
   controlling the vibration generation device so as to generate the vibration while the vibration area is being touched; and
   enabling a user to register a new pattern for the vibration area pattern,
   wherein the user registers the new pattern for the vibration area pattern by tracing the new pattern on the touch panel.

7. The program according to claim 6, wherein the current internal state indicates that a communication was not confirmed by a user.

8. A mobile terminal, comprising:
   a touch panel detecting a touch position;
   a vibration generation device configured to generate vibration;
   an assignment device configured to assign different user-creatable vibration area patterns having different shapes that outline vibration areas generating the vibration on the touch panel, to a plurality of internal states, respectively;
   a control device configured to activate, according to a current internal state, the vibration area pattern assigned to the current internal state and to control the vibration generation device so as to generate the vibration while the vibration area is being touched;
   a registration device configured to enable a user to register a new pattern for the vibration area pattern,
   wherein the user registers the new pattern for the vibration area pattern by tracing the new pattern on the touch panel.

9. The mobile terminal according to claim 8, wherein the current internal state indicates that a communication was not confirmed by a user.

* * * * *

UNITED STATES PATENT AND TRADEMARK OFFICE
CERTIFICATE OF CORRECTION

PATENT NO. : 8,351,991 B2  
APPLICATION NO. : 12/613721  
DATED : January 8, 2013  
INVENTOR(S) : Kozo Komiya Page 1 of 1

It is certified that error appears in the above-identified patent and that said Letters Patent is hereby corrected as shown below:

On the title page, Item (73), the Assignee Information is incorrect. Item (73) should read:

--(73) Assignee: Sony Mobile Communications AB,
                Lund (SE)--

Signed and Sealed this  
Ninth Day of April, 2013

Teresa Stanek Rea  
*Acting Director of the United States Patent and Trademark Office*